United States Patent [19]

Fraidlin

[11] Patent Number: 4,688,160
[45] Date of Patent: Aug. 18, 1987

[54] SINGLE ENDED FORWARD CONVERTER WITH RESONANT COMMUTATION OF MAGNETIZING CURRENT

[75] Inventor: Simon Fraidlin, Randolph, N.J.

[73] Assignee: American Telephone and Telegraph Co., AT&T Bell Labs, Murray Hill, N.J.

[21] Appl. No.: 810,981

[22] Filed: Dec. 19, 1985

[51] Int. Cl.$^4$ .......................................... H02M 3/335
[52] U.S. Cl. ...................................... 363/21; 363/131
[58] Field of Search ..................................... 363/18–21, 363/97, 131

[56] References Cited

U.S. PATENT DOCUMENTS

| | | | |
|---|---|---|---|
| 4,313,155 | 1/1982 | Bock et al. | 363/21 |
| 4,415,959 | 11/1983 | Vinciarelli | 363/21 |
| 4,498,128 | 2/1985 | Peterson et al. | 363/21 |
| 4,559,590 | 12/1985 | Davidson | 363/21 |
| 4,559,591 | 12/1985 | Grünsch | 363/21 |
| 4,593,346 | 6/1986 | Nooijen et al. | 363/21 |

Primary Examiner—Patrick R. Salce
Assistant Examiner—Marc S. Hoff
Attorney, Agent, or Firm—Alfred G. Steinmetz

[57] ABSTRACT

A single ended forward converter periodically resets the transformer core to prevent saturation and returns magnetizing energy to the energy source, requiring only the addition of one resonating capacitor to the converter circuit.

The transformer is reset and the energy recovered into the input voltage source by resonant commutation of the magnetizing current between the magnetizing inductance and a resonating capacitor. A resonant current path is completed during a nonconducting interval of the power transistor switch through a resonating capacitor, shunting the output rectifying diode connected to the secondary winding, and the flyback diode of the output filter to permit transfer of the transformer's magnetizing energy to the input energy source. This magnetizing energy transfer from core to capacitor to input energy source has a resonant quasi-sine waveform and utilizes the resonant properties of the network to enable its flow back into the input voltage source.

5 Claims, 3 Drawing Figures

SINGLE ENDED FORWARD CONVERTER WITH RESONANT COMMUTATION OF MAGNETIZING CURRENT

FIELD OF THE INVENTION

This invention relates to switching power supplies and more particularly to the forward converter. It is specifically concerned with operation of the converter's power transformer and in particular with a periodic resetting of the core of the transformer.

BACKGROUND OF THE INVENTION

The forward converter is basically a buck-type voltage regulator with transformer isolation between the power switch and the output filter inductor. When the power switch is conducting, current flows through a power transformer, a rectifying diode and the output filter inductor to the load. During nonconduction of the power switch, the rectifying diode is back biased; however, a load current due to stored energy in the filter inductor continues to flow through a flyback diode. Due to the unidirectionality of current flow, the build up of magnetizing flux in the primary winding is in only one direction and hence provision must be made to allow the core to reset by allowing the magnetizing flux to return to the initial state after each cycle.

The conventional methods of demagnetizing the transformer core have provided a discharge path for demagnetizing current when the power switch is nonconducting. One such embodiment utilizes a demagnetizing winding tightly coupled to the primary winding to conduct the demagnetizing current back to the voltage source. Other related techniques use a dissipative clamp to dissipate the energy stored in the transformer's core each cycle and must handle a very high average power level. These conventional techniques, however, either require a precision transformer winding or else significantly reduce the overall efficiency of the converter. Further details concerning these prior methods may be found in "A Design For Optimizing The Power Device Utilization In Feed-Forward Converters" by S. Hayes in Proceedings of Power Con 8, 1981, pages F-3; 1-10.

Another recent technique of resetting the transformer of a forward converter is disclosed in U.S. Pat. No. 4,441,146, issued to P. Vinciarelli on Apr. 3, 1984 and entitled "Optimal Resetting Of The Transformer's Core In Single Ended Forward Converters". This reference discloses a reset circuit in which a capacitor and an auxiliary transistor switch are connected in series. This series connection is in turn connected in parallel with the power transformer's secondary winding. A control circuit operates the auxiliary switch in an inverse synchronous relation with the power transistor switch so that when one conducts the other is nonconducting. The capacitor is sized such that its voltage is essentially constant during the reset period. During reset of the core when the auxiliary transistor switch is conducting, the magnetizing currents are initially utilized to charge the capacitor; subsequently the capacitor is discharged into the transformer winding supplying energy to reset it for the next cycle.

All of the above arrangements share the same disadvantage of requiring multi-component added reset circuitry which detracts from the otherwise natural circuit simplicity of the forward converter.

SUMMARY OF THE INVENTION

A single ended forward converter embodying the principles of the invention periodically resets the transformer core to prevent saturation and returns magnetizing energy to the energy source, requiring only the addition of one resonating capacitor to the converter circuit.

The transformer is reset and the energy recovered into the input voltage source in accordance with the invention by resonant commutation of the magnetizing current between the magnetizing inductance and a resonating capacitor. A resonant current path is completed during a nonconducting interval of the power transistor switch through a resonating capacitor, shunting the output rectifying diode connected to the secondary winding, and the flyback diode to permit transfer of the transformer's magnetizing energy to the input energy source. This magnetizing energy transfer from core to capacitor to input energy source has a resonant quasi-sine waveform and utilizes the resonant properties of the network to enable its flow back into the input voltage source.

BRIEF DESCRIPTION OF THE DRAWINGS

An understanding of the invention may be readily attained by reference to the following specification and its accompanying drawing in which.

DETAILED DESCRIPTION

Figure 1:
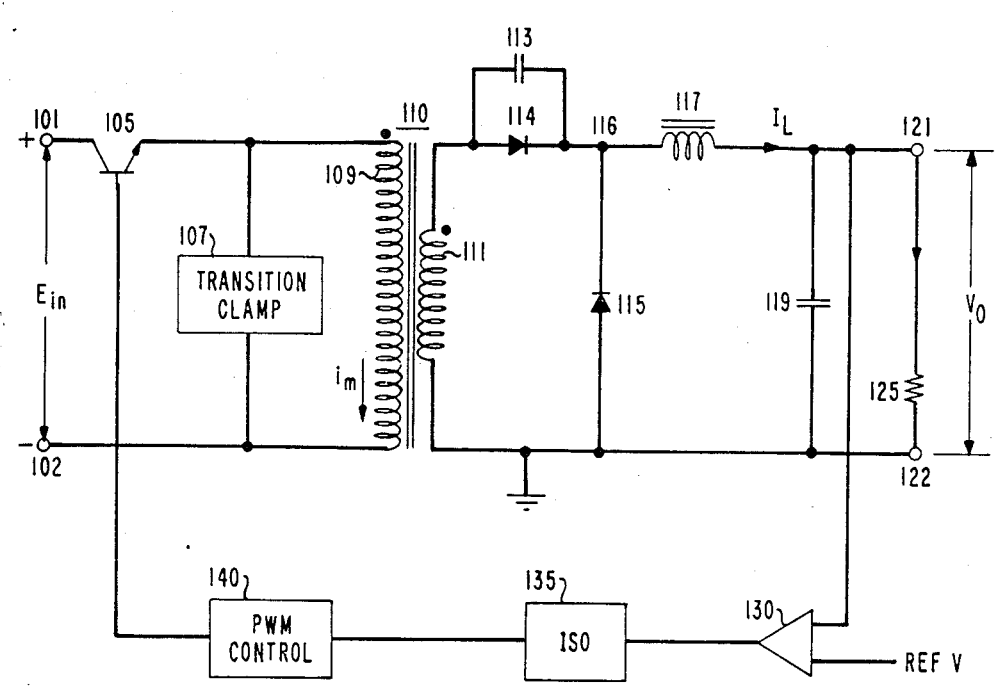
FIG. 1 is a schematic of a forward type converter embodying the principles of the invention.

A forward type converter embodying the principles of the invention is shown in FIG. 1. A DC voltage is applied to input terminals 101 and 102 and is periodically connected by power transistor switch 105 to a primary winding 109 of the power transformer 110. Periodic conductivity of the power transistor switch 105 is controlled by a PWM (pulse width modulation) control 140 which controls a duty cycle of the power switch 105 in order to maintain a regulated output voltage across output terminals 121 and 122 and across the load 125 connected thereto. PWM control 140 operates in response to an error signal generated by error amplifier 130. Amplifier 130 compares the output voltage with a reference voltage in order to generate an error signal coupled to PWM control 140 via an isolating circuit 135 which may be an opto or magnetic type isolator.

The output of secondary winding 111 is coupled to the output terminals 121 and 122 via a rectifying diode 114 and filter inductor 117. The respective winding orientation of secondary winding 111 with respect to primary winding 109 and the polarity orientation of rectifying diode 114 is such that an output current is conducted through a forward biased rectifying diode 114 during conduction intervals of the power transistor switch 105. A flyback diode 115 is coupled to provide a current path for the current in inductor 117 during the nonconduction intervals of power transistor switch 105. The capacitor 119 is included in the output circuitry to provide filtering and stabilization of the output voltage. A resonating capacitor 113 is connected in shunt with rectifying diode 114 for the purposes of facilitating a resetting of the core of transformer 110 as described below.

The resetting of the core of transformer 110 is accomplished during each cycle of operation through a nondissipative recovery of the energy stored in the magnetizing inductance of transformer 110 and a high efficiency of the converter circuit is maintained by returning this energy to the input voltage source. The mechanism of energy recovery involves resonant action between the magnetizing inductance of transformer 110 and the capacitor 113 shunting rectifying diode 114.

As indicated above, the primary winding 109 of transformer 110 is driven in only one direction due to the unipolar nature of the driving voltage pulses and without provision to reset the core in each cycle of operation, the flux generation due to magnetizing current would continue to build up unidirectionally until the core was driven into saturation. In accordance with the invention, a resonant current path is provided so that a resonant current initiated by the magnetizing current is periodically generated to reset the core. Energy due to this current is returned to the input voltage source during conduction of the power transistor with negligible energy dissipation. This operation of resetting the transformer core causes the flux excursions in each cycle of operation to be bidirectional.

Figure 2:
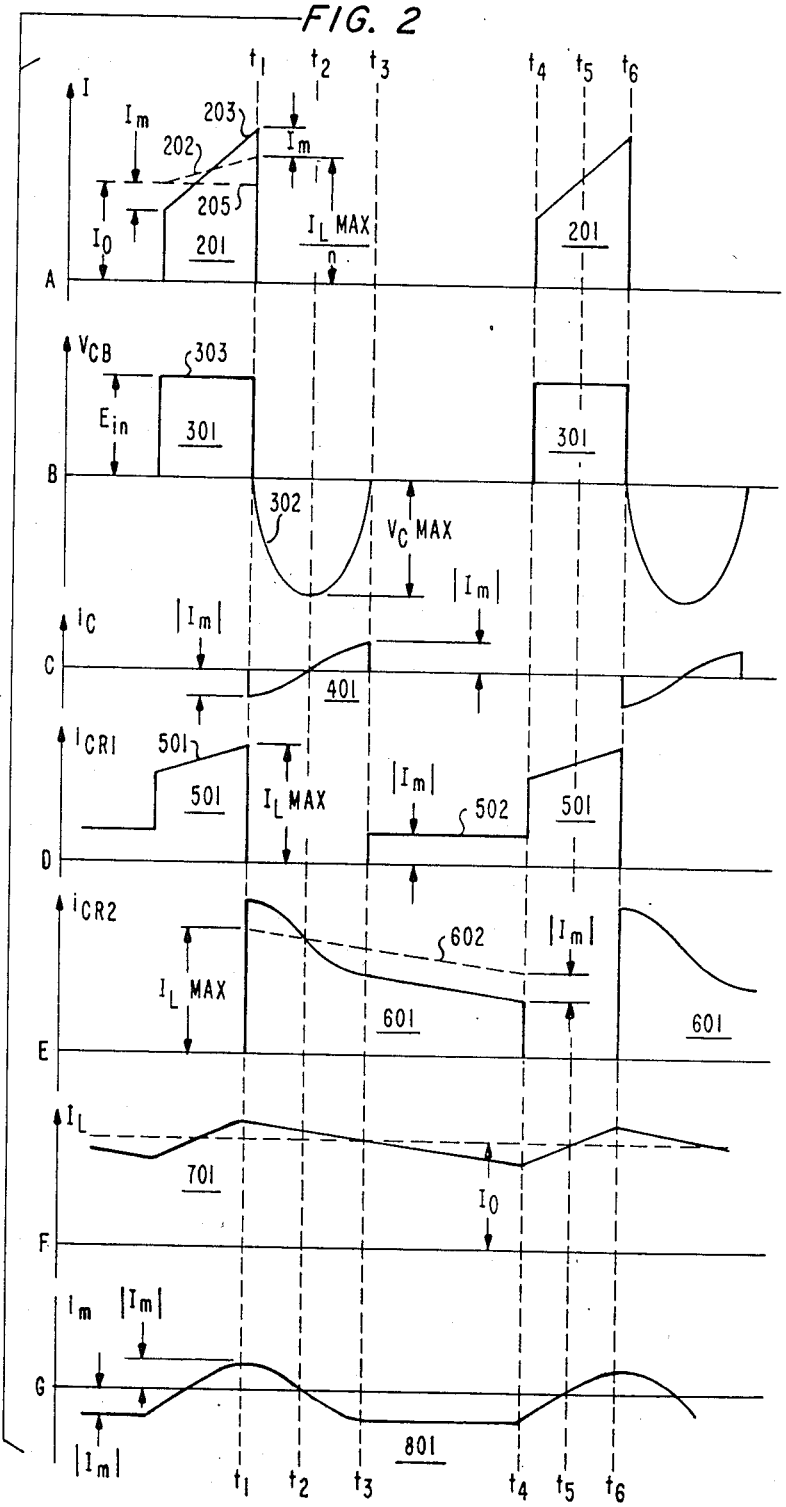
FIG. 2 discloses current and voltage waveforms useful in explaining the operation of the converter circuit of FIG. 1.

The invention may be readily understood by describing the circuit operation of the converter of FIG. 1 with reference to the waveforms of FIG. 2. These waveform amplitudes illustrated assume a one-to-one ratio between primary and secondary windings in transformer 110. This ratio is selected for expository purposes only and is not intended to be limiting. The periodic current conducted by the power transistor 105, as applied to primary winding 109, is shown by the current pulse waveforms 201 in FIG. 2 part A. These waveforms have a trapezoidal waveshape with an increasing ramp slope due to the charging of the output filter inductor 117 and to the magnetizing inductance being charged. The shallow ramp 202, shown in dotted line, is due to charging of the filter inductor 117 whereas the steeper slope 203 shown as a solid line includes both the ramp of slope 202 and a magnetizing current component. Dotted line 205 represents the converters output DC current level, which represents the average of the current pulse train. The averaging function is performed by inductor 117 and capacitor 119.

The cycle of operation used in describing the resetting of the core begins at time $t_1$ which is coincident with the trailing edge of the first of the two trapezoidal current pulses. At this time $t_1$ the current through the power transistor 105 has returned to a zero value. The voltage appearing across the secondary winding 111 subsequent to time $t_1$ is shown by the negative quasi sinusoid waveform 302 of the voltage waveform 301 in FIG. 2 part B. Voltage waveform 301 has a constant value 303 which is equal to the input voltage level during the conduction interval of power transistor 105 prior to time $t_1$. It assumes a negative sinusoidal waveshape 302 during a subsequent nonconduction interval of power transistor 105 during the time interval $t_1$ to $t_3$.

Figure 3:
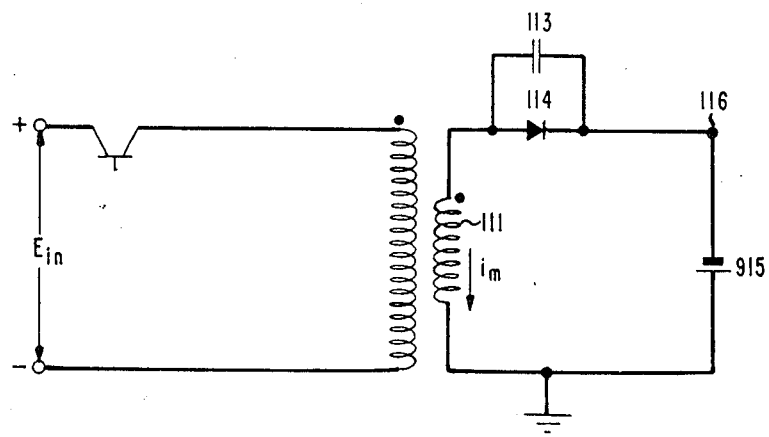
FIG. 3 is an idealized circuit path schematic useful in explaining the operation of the converter of FIG. 1.

During the conduction interval of power transistor 105 current flows through the rectifying diode 104. Its waveshape, as shown by waveform 501 in FIG. 2 part D has a trapezoidal shape, with a ramp slope 503 identical to the slope 202 in FIG. 2. The difference in the slopes of ramps 503 and 203 represents the magnetizing current contribution to the ramp 203. This rectified current promptly decreases to a zero value at time $t_1$ when the power transistor 105 becomes nonconducting. At this instant, at time $t_1$, current begins to flow through flyback diode 115 in order to maintain current continuity in the filter inductor 117. The inductor current is shown by waveform 701 in FIG. 2 part F, and the flyback diode current is shown by waveform 601 in FIG. 2 part E. At this time $t_1$, the voltage at node 116, in the circuit shown in FIG. 1 is just one diode voltage drop below ground potential, and hence, the node 116 may be considered as a negative voltage source potential having a value equaling approximately one diode voltage drop. The active signal path of the converter at this instant $t_1$ is shown by the schematic of FIG. 3 wherein the diode 115 is replaced by a symbolic battery 915 placing node 116 in FIG. 3 at a negative potential with respect to ground. At this point, the magnetizing current $i_m$ which previously circulated in the primary circuit, as shown in FIG. 1, now circulates as shown in FIG. 3 through the secondary winding 111, the flyback diode (shown symbolically as a battery 915) and the capacitor 113, since the rectifying diode 114 is now reverse biased. The current path of this magnetizing current from time $t_1$ to time $t_3$ is designed to be an LC resonant circuit wherein L or $L_m$ is the transformers magnetizing inductance and the capacitance designated herein as C represents the capacitor 113 shunting the rectifying diode. The magnetizing current $i_m$ is defined by the relation:

$$i_m = I_m \cos(\omega_o T)$$

where $I_m$ is the peak magnetizing current level at $t_1$, and $\omega_o$ is defined by:

$$\omega_o = \frac{1}{\sqrt{L_m C}}$$

The voltage $V_c$ across the resonant capacitor 113 is defined by:

$$V_c = V_m \sin \omega_o t$$

where $V_m$ is defined by:

$$V_m = I_m \sqrt{\frac{L_m}{C}}$$

At time $t_1$ the magnetizing energy $E_m$ is stored in the core of transformer 110 and is defined by:

$$E_m = I_m^2 \frac{L_m}{2}$$

By the time $t_2$ this energy has been converted into electrical energy $E_c$ which is stored in the capacitance C and is defined by:

$$E_c = V_m^2 \frac{C}{2}$$

The magnetizing current $i_m$ flowing through capacitor 113 in the symbolic circuit schematic of FIG. 3 is shown by waveform 401 in FIG. 2 part C and as shown it initially flows in one direction with the magnitude $I_m$ at $t_1$; declines to zero value at time $t_2$ and flows in the opposite direction with the magnitude $I_m$ at the time $t_3$.

The secondary winding voltage, during these time intervals as shown in FIG. 2 part B, approximates a negative half-cycle of a sinewave achieving its negative peak magnitude at time $t_2$ and being zero at $t_1$ and $t_3$.

After the time $t_3$, the rectifying diode 114 becomes forward biased and the magnetizing current now flows in the opposite direction to the arrow shown in FIG. 3 in the path defined by the rectifying diode 114, and the flyback diode 115 shown by battery symbol 915 and represented by the current waveform 502 shown in FIG. 2 part D. This current continues as a constant magnitude waveform 502 until the power transistor 105 is again biased conducting at time $t_4$. During this time from time $t_3$ to time $t_4$, the only voltage drop in the current loop is across the rectifying diode 114, and hence, with no voltage drop across the secondary winding 111 the energy associated with the magnetizing current is conserved. The current in the flyback diode 115 is, during this time interval as shown by waveform 601 in FIG. 2 part E, equal to the inductor current $I_L$ decreased by the value of the magnetizing current $I_m$.

At time $t_4$, the power transistor 105 is again biased into conduction and the flyback current through flyback diode 115 at this time, as shown by waveform 601 in FIG. 2 part E, decreases to zero. The voltage now appearing across the secondary winding as shown in FIG. 2 part B by waveform 301 stays constant until $t_6$.

The total magnetizing current represented as various segmented component values in FIG. 2 parts C, D and E, is shown as a composite single entity current by waveform 801 in FIG. 2 part G. This composite magnetizing current, however during its cyclic course, flows through different circuit paths, as discussed above and shown by the various waveforms in FIG. 2. At time $t_1$, the magnetizing current is at a maximum value and is flowing in the same direction as the load current, as shown by waveforms 701 and 801 in FIG. 2 parts F and G. The magnetizing current decays to a zero value and changes direction at time $t_2$ and attains a constant value at $t_3$ which it maintains up until time $t_4$. By time $t_5$ the magnetizing current returns to zero and again changes direction and by time $t_6$ has achieved a maximum value identical to that attained previously at time $t_1$. The negative magnetizing current flowing in the time interval between time $t_2$ and time $t_5$ reduces the value from the switched current flowing through the switch as shown in FIG. 2 part A, where the dotted line 202 represents the current through the inductor 117. Actual switch current at the beginning and until the middle of the pulse is smaller by the amount of $-I_m$. This decrease in switch current to waveform level 203 by the amount of the magnetizing current represents the transfer of magnetizing energy back into the input source and by time $t_5$ the transformer core has been completely reset.

This resetting process, as described above, operates by transferring the magnetizing current into stored charge in capacitor 113 during the time interval from time $t_1$ to time $t_2$. This transfer is reversed during the subsequent interval from time $t_2$ to time $t_3$ during whih energy is transferred back from capacitive electrical energy into magnetic energy in the transformer core 110. This process is indicated by the reversal of direction of the magnetizing current waveform 401 of FIG. 2 part C. This energy is nondissipatively stored in the core of the transformer 110 and remains there for the time interval from time $t_2$ to time $t_4$. This energy is returned to the input source, as shown by the current waveform 801 in FIG. 2 part G during the time interval from time $t_4$ to time $t_5$.

Practical implementation of this arrangement requires that the voltage stress across the power transistor 105 be maintained below a certain threshold value $V_{sw}$ representing its safe peak voltage capacity and that the duration of the time interval from time $t_1$ to time $t_3$ when the resonant magnetizing current is generated must be less than or equal to the allowable minimum off-time of the power transistor 105.

These conditions may be expressed by the relations:

$$E_{in} + V_{cmax} \geq V_{sw}$$

$$V_{cmax} \geq V_{sw} - E_{in}$$

where $V_{cmax}$ is the maximum voltage across the resonating capacitance C.

The energy stored in capacitor 113 is substantially equal to the energy stored in the core of transformer 110, and hence:

$$C \frac{V_{cmax}^2}{2} \geq I_m^2 \frac{L_m}{2}$$

where $I_m$ is expressed as:

$$I_m = \frac{F_{in} T_{on}}{2 L_m}$$

where $E_{in} \times T_{on}$ is the constant voltage time product of a pulse width modulated converter and $T_o$ is the conduction duration of transistor 105, where:

$$T_{on} E_{in} = \frac{V_o n}{f_c}$$

This volt seconds product is a constant during steady state operation.

The requirement limiting the switch voltage stress on the power transistor 105 may be expressed as:

$$\frac{C V_{cmax}^2}{2} - \frac{V_o^2 n^2}{8 L_m f_c^2} > 0$$

where:
$f_c$ is the converter operating frequency;
n is the transformer turns ratio;
$T_{on}$ is the conducting time of the power switch;
$E_{in}$ is the input voltage; and
$V_o$ is the output voltage of the converter.

The limitations on the time interval of reverse energy transfer may be expressed as:

$$(t_3 - t_1) \leq \frac{1}{f_c}(1 - D_{max})$$

where $D_{max}$ is the maximum duty cycle ratio and is expressed as:

$$D_{max} = \frac{V_o n}{E_{inmin}}$$

Since the interval from time $t_1$ to time $t_3$ is half a period of oscillation between $L_m$ and C $$(t_3 - t_1) = \pi \sqrt{L_m C}$$

and the second requirement limiting time interval of reverse energy transfer may be expressed as:

$$\frac{E_{min} - V_o n}{f_c E_{inmin}} - \pi \sqrt{L_m C} > 0$$

A converter must have parameter values in accordance with the equations of the requirements, expressed above, in order to effectively utilize the resonant technique of resetting the transformer core. In practice this means that the voltage across the primary winding must be limited during nonconduction of the power transistor and that the off-time duration must equal or exceed the resonant current duration of the magnetizing current.

The volt seconds product of the transformer windings is a constant during steady state operation. This product value changes during transition phases of the converter such as load variations and a new steady state value is attained. Hence a transition clamp 107 is connected to protect the transistor switch 105 against overvoltage during these transitions. Since these transitions are of only very short duration, the transition clamp needs only a very small power capacity since the average power it handles is extremely low.

What is claimed is:

1. A forward converter comprising:
   input means for accepting a source of energy;
   a transformer having a magnetizing inductance and including a primary winding and a secondary winding;
   a periodically operated switch for coupling the input means to the primary winding;
   output means for coupling the secondary winding to output terminals for accepting a load to be energized and including;
   a filter inductor and a rectifying diode for coupling the secondary winding to the filter inductor and a flyback diode for completing a current path to the filter inductor when the rectifying diode is nonconducting; and
   a capacitor shunting the rectifying diode and having a capacitance value that is resonant with the magnetizing inductance at an operating frequency of the converter.

2. A forward converter comprising:
   a transformer including a magnetizing inductance and having an input winding and an output winding;
   input means for accepting a source of energy;
   a power switch for periodically coupling energy from the input means to the input winding in a unidirectional flow;
   output means for accepting a load to be energized;
   a rectifying diode and a filter inductor connected in a series connection, and the series connection coupling the output winding to the output means, and a flyback diode connected to supply current to the filter inductor when the rectifying diode is nonconducting,
   a capacitor shunting the rectifying diode and having a capacitor value that causes the capacitor and magnetizing inductance to be resonant at an operating frequency of the power switch, and a winding of the transformer, the flyback diode and the capacitor being part of a resonant closed circuit path;
   whereby current due to stored magnetizing energy in the magnetizing inductance flows in a first direction in the resonant closed circuit path and is stored as electrical energy in the capacitor, and current flows in a second direction opposite to the first direction to discharge electrical energy stored in the capacitor.

3. A forward converter as defined in claim 1 wherein a resonant time constant of the capacitor and magnetizing inductance is shorter in duration than a minimum off-time duration of the periodically operated switch.

4. A forward converter as defined in claim 3 wherein the
   forward converter includes a closed circuit path including the secondary winding, the flyback diode and the capacitor and further being operative to constrain a voltage waveshape across the secondary winding to have a half cycle sinusoid waveform during at least a portion of the minimum off-time duration.

5. A forward converter as defined in claim 2 wherein a voltage across the output winding is constrained to be zero as magnetizing energy flows in said second direction, and
   wherein a voltage across the output winding is constrained to a substantially sinusoidal waveform when not zero during a nonconduction period of the power switch.

* * * * *